(12) United States Patent
White et al.

(10) Patent No.: US 10,545,629 B2
(45) Date of Patent: Jan. 28, 2020

(54) GRAPHICAL INTERFACE FOR AN AUGMENTED INTELLIGENCE SYSTEM

(71) Applicant: Alcatel-Lucent USA Inc., Murray Hill, NJ (US)

(72) Inventors: Christopher A. White, Neshanic Station, NJ (US); Mark M. Clougherty, Chatham, NJ (US); Iraj Saniee, New Providence, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 338 days.

(21) Appl. No.: 15/091,525

(22) Filed: Apr. 5, 2016

(65) Prior Publication Data

US 2017/0285911 A1    Oct. 5, 2017

(51) Int. Cl.
*G06F 3/048* (2013.01)
*G06F 16/26* (2019.01)
*G06F 3/0481* (2013.01)
*G06F 16/2457* (2019.01)

(52) U.S. Cl.
CPC .... *G06F 3/04817* (2013.01); *G06F 16/24578* (2019.01); *G06F 16/26* (2019.01)

(58) Field of Classification Search
CPC ................................. G06F 3/048; G06F 16/26
See application file for complete search history.

(56) References Cited

U.S. PATENT DOCUMENTS

| | | | |
|---|---|---|---|
| 7,840,524 B2 | 11/2010 | Egger et al. | |
| 2005/0033742 A1 | 2/2005 | Kamvar et al. | |
| 2007/0226640 A1* | 9/2007 | Holbrook | G06F 17/30864 715/765 |
| 2008/0228746 A1 | 9/2008 | Markus et al. | |
| 2010/0235762 A1* | 9/2010 | Laiho | G06F 16/972 715/753 |
| 2011/0125765 A1* | 5/2011 | Tuli | G06F 17/30035 707/751 |
| 2012/0131506 A1* | 5/2012 | Sakata | G06F 3/0488 715/823 |
| 2012/0278261 A1 | 11/2012 | Lin et al. | |
| 2013/0159884 A1* | 6/2013 | Isozu | H04W 4/023 715/753 |
| 2014/0207791 A1 | 7/2014 | Danilevsky et al. | |
| 2015/0135048 A1* | 5/2015 | Withgott | G06F 17/2235 715/205 |
| 2017/0228445 A1* | 8/2017 | Chiu | G06F 16/25 |

* cited by examiner

*Primary Examiner* — Xuyang Xia

(74) *Attorney, Agent, or Firm* — Duft & Bornsen, PC

(57) ABSTRACT

Systems and methods for exploring a data collection. An exemplary system includes a GUI that displays a window to the user, and displays data element icons within the window representing an initial set of data elements from the data collection. Visual properties of the data element icons indicate the relevance of the data elements in the initial set to the data collection. The GUI receives input from the user selecting a data element icon within the window. Selection of the data element icon assigns a corresponding data element in the initial set as an initial anchor set. The GUI displays another window to the user, displays an anchor icon for the initial anchor set, and displays the data element icons representing a relevant set of data elements. Visual properties of the data element icons indicate the relevance of the data elements in the relevant set to the initial anchor set.

35 Claims, 15 Drawing Sheets

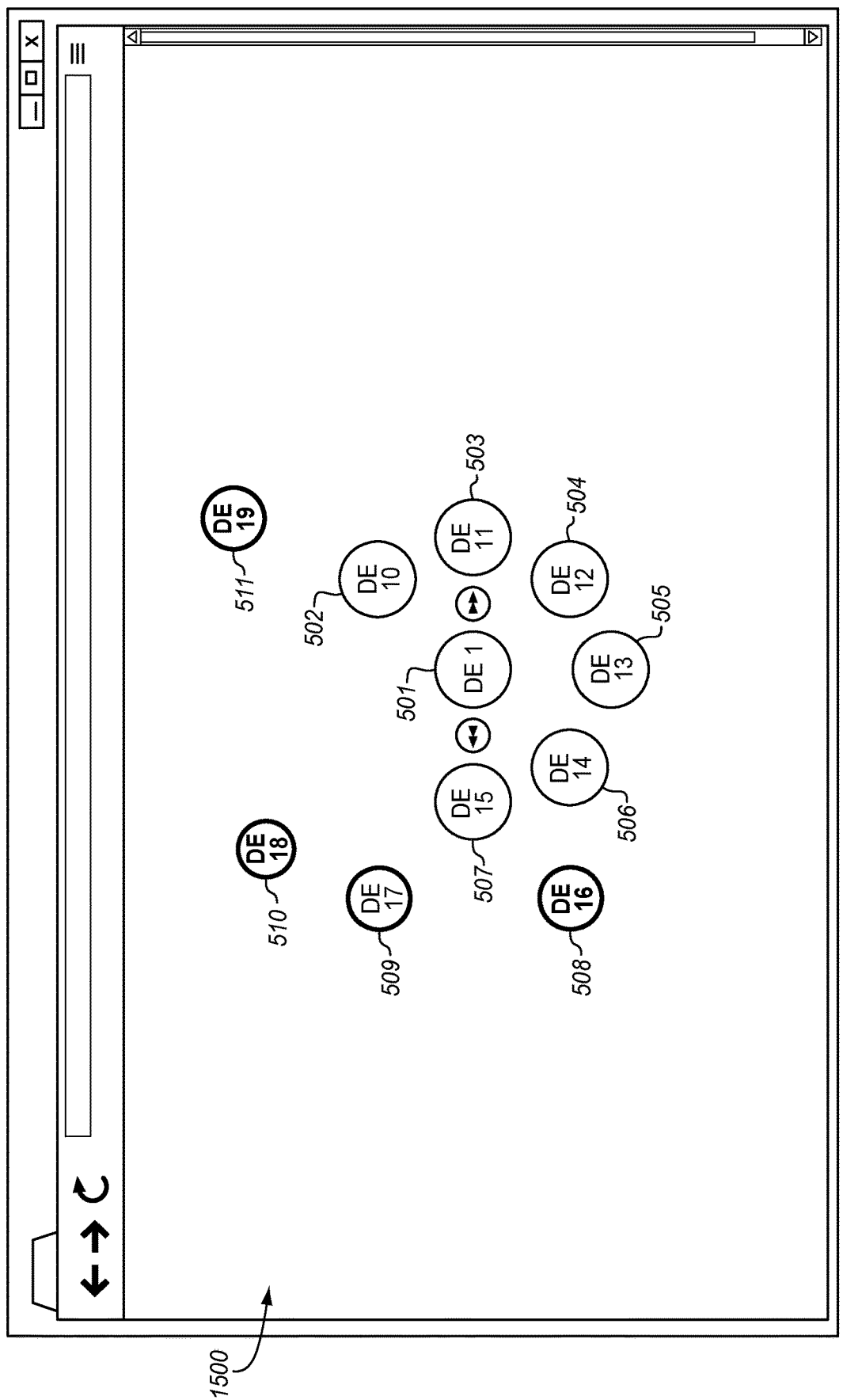

GRAPHICAL INTERFACE FOR AN AUGMENTED INTELLIGENCE SYSTEM

FIELD OF THE INVENTION

The invention is related to the field of data processing, and more particularly, to assisting a user in navigating through large collections of data.

BACKGROUND

Businesses, companies, private and public organizations, and other entities may store large amounts of data, such as in one or more databases. It may be difficult for a user to parse through a large collection of data to find the desired information. A search engine may be used to assist the user in searching through the data. A typical search engine allows a user to enter one or more keywords. The search engine parses the collection of data to find matches for the keyword(s), and displays the results of the search (i.e., the matches) to the user. The search results are commonly displayed to the user as a list of the matches.

Although search engines are able to find matches for the keyword(s), the user has to be savvy enough to enter the correct keywords in order to find the desired information. Users may want improved systems for navigating through large collections of data so that the most relevant information is provided to the user.

SUMMARY

Embodiments described herein provide for an augmented intelligence system that graphically displays relevant information to a user. For a large collection of data, the augmented intelligence system separates the data into data elements, and assigns a relevance score to each data element. The augmented intelligence system receives input from a user selecting one or more of the data elements as a focus for exploring the large data collection. The augmented intelligence system then re-computes the scores based upon the selected focus and graphically displays other data elements that are relevant to the focus. The visual properties or characteristics of the data elements, as graphically displayed, indicate the relevance score of the data elements to the focus. Therefore, the augmented intelligence system assists the user in making selections of the most relevant information.

One embodiment comprises a system for exploring a collection of data. The system includes a controller that identifies an initial set of data elements from the collection of data for presentation to a user as potential anchors for exploring the collection of data, and identifies an initial score for each data element in the initial set. The initial score indicates a relevance of each data element in the initial set to the collection of data. The system further includes a Graphical User Interface (GUI) that displays a first window to the user, and displays data element icons for the data elements in the initial set within the first window. The visual properties of the data element icons within the first window indicate the magnitude of the initial score of the data elements in the initial set. The GUI receives input from the user indicating one or more of the data elements in the initial set as an initial anchor set for exploring the collection of data. The controller identifies a first relevant set of data elements that are relevant to the initial anchor set, and identifies a first relevance score for each data element in the first relevant set. The first relevance score indicates relevance of each data element in the first relevant set to the initial anchor set. The GUI displays a second window to the user, displays an anchor icon for the initial anchor set within the second window, and displays the data element icons for the data elements in the first relevant set within the second window. The visual properties of the data element icons within the second window indicate the magnitude of the first relevance scores of the data elements in the first relevant set.

In another embodiment, the GUI receives input from the user selecting one or more of the data element icons within the second window to modify the initial anchor set to create a modified anchor set. The controller identifies a second relevant set of data elements that are relevant to the modified anchor set, and identifies a second relevance score for each data element in the second relevant set. The second relevance score indicates relevance of each data element in the second relevant set to the modified anchor set. The GUI displays a third window, displays the anchor icon for the modified anchor set within the third window, and displays the data element icons for the data elements in the second relevant set within the third window. The visual properties of the data element icons within the third window indicate the magnitude of the second relevance scores of the data elements in the second relevant set.

In another embodiment, the GUI varies a size of the data element icons within the second window to indicate the magnitude of the first relevance scores of the data elements in the first relevant set.

In another embodiment, the GUI varies a position of the data element icons in relation to the anchor icon within the third window to indicate the magnitude of the second relevance scores of the data elements in the second relevant set. The GUI maintains the size of the data element icons within the third window to indicate the relevance of the data elements in the second relevant set to the initial anchor set.

In another embodiment, the GUI receives input from the user through the first window indicating at least one keyword. The controller filters the initial set of data elements based on the at least one keyword to generate a filtered initial set of data elements. The GUI displays the data element icons for the data elements in the filtered initial set within the first window.

In another embodiment, the GUI displays the data element icons within the second window as different sizes based on the first relevance scores of the data elements in the first relevant set.

In another embodiment, the GUI displays the data element icons in a largest size within the second window for the data elements in the first relevant set having the first relevance scores that are the highest.

In another embodiment, the GUI displays the data element icons within the second window at different positions relative to the anchor icon based on the first relevance scores of the data elements in the first relevant set.

In another embodiment, the GUI displays the data element icons in closer proximity to the anchor icon within the second window for the data elements in the first relevant set having the first relevance scores that are the highest.

In another embodiment, the GUI displays the anchor icon toward the center of the second window, and displays the data element icons at radial positions around the anchor icon.

In another embodiment, the data elements in the first relevant set are sorted into categories. The GUI displays the data element icons related to a first category in the second window, and displays the data element icons related to a second category in a third window.

In another embodiment, the GUI displays the data element icons per category in a different color.

In another embodiment, the GUI displays the anchor icon and the data element icons as circular bubbles. The circular bubbles contain a description of their associated data element.

In another embodiment, the GUI receives input from the user to view a chain of association between the initial anchor set and a first data element of the first relevant set. The GUI displays a third window, displays the anchor icon within the third window, displays the data element icon representing the first data element within the third window, and displays one or more links between the anchor icon and the data element icon representing the first data element within the third window. The link(s) indicates a relationship between the anchor set and the first data element.

In another embodiment, the link(s) indicates a common data element that is common to the anchor set and the first data element.

In another embodiment, the GUI receives input from the user through the second window selecting one of the data element icons within the second window that represents a first data element, and displays content from the first data element to the user.

In another embodiment, the visual properties of each of the data element icons within the second window indicate how much the first relevance scores for the data elements in the first relevant set will change if the data elements are included in the initial anchor set.

Another embodiment comprises a system for exploring a collection of data. The system includes a GUI for interacting with a user to explore the collection of data, which is separated into data elements. The GUI displays a first window to the user, and displays data element icons within the first window representing an initial set of data elements. The visual properties of the data element icons within the first window indicate the relevance of the data elements in the initial set to the collection of data. The GUI receives input from the user selecting at one or more of the data element icons within the first window. Selection of the data element icon(s) within the first window assigns one or more of the data elements in the initial set as an initial anchor set for exploring the collection of data. The GUI displays a second window to the user, displays an anchor icon for the initial anchor set within the second window, and displays the data element icons within the second window representing a first relevant set of data elements. The visual properties of the data element icons within the second window indicate the relevance of the data elements in the first relevant set to the initial anchor set.

Another embodiment comprises a method for exploring a data collection. The method includes displaying a first window to a user via a GUI for interacting with the user to explore the collection of data, where the collection of data is separated into data elements. The method includes displaying data element icons within the first window via the GUI representing an initial set of data elements. The visual properties of the data element icons within the first window indicate the relevance of the data elements in the initial set to the collection of data. The method further includes receiving input from the user via the GUI selecting one or more of the data element icons within the first window. Selection of the data element icon(s) within the first window assigns one or more of the data elements in the initial set as an initial anchor set for exploring the collection of data. The method further includes displaying a second window to the user via the GUI, displaying an anchor icon for the initial anchor set within the second window via the GUI, and displaying the data element icons within the second window via the GUI representing a first relevant set of data elements. The visual properties of the data element icons within the second window indicate the relevance of the data elements in the first relevant set to the initial anchor set.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

FIG. 15 illustrates a results window displayed by a GUI for presenting data elements to a user in an exemplary embodiment.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
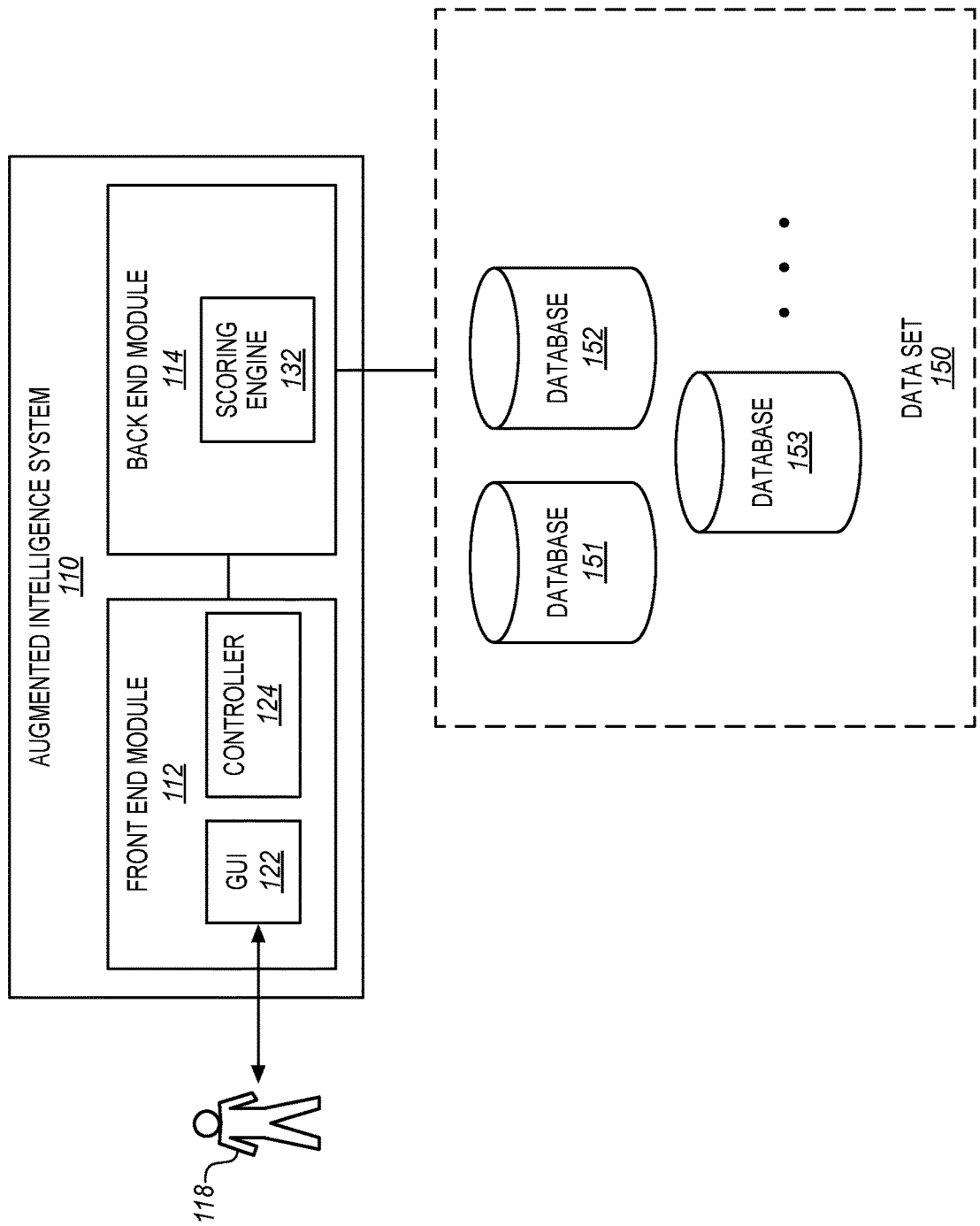
FIG. 1 is a schematic diagram of an augmented intelligence system in an exemplary embodiment.

FIG. 1 is a schematic diagram of an augmented intelligence system 110 in an exemplary embodiment. Generally, augmented intelligence refers to the use of information technology in augmenting human intelligence. There are many instances where humans interact with systems that store large amounts of data. For example, an enterprise may maintain multiple databases that store a large collection of data, which may be referred to as a corpus. A user may have trouble navigating through the corpus to find what he/she is looking for. Augmented intelligence system 110 helps organize the corpus so that the user can more easily find desired information.

Augmented intelligence system 110 includes a front end module 112 and a back end module 114. Front end module 112 is configured to interact with a user 118 (i.e., a human) that wants to explore a collection of data (also referred to as a corpus). Front end module 112 includes a Graphical User Interface (GUI) 122 and a controller 124. GUI 122 comprises a device or system that provides an interface between a user and electronic devices through graphical symbols or representations. A GUI is distinguished from a text-based interface that interacts with users mainly through text. Although not specifically shown in FIG. 1, GUI 122 may include a pointer, a pointing device, icons, a dialog box, windows, etc. A pointer is a symbol that appears on a screen, and tracks movement of the pointing device operated by a user. The pointing device allows a user to move the pointer, and select objects (e.g., icons) on the screen. Examples of the pointing device include a mouse or trackball. Icons are images or pictures that represent data elements, files, images, links, etc. An icon may be selectable or non-selectable by the user. A dialog box (or text box) is a graphical control element that communicates information to a user, and/or prompts a user for information. Windows comprise areas on a screen for displaying icons or other graphics for interacting with a user.

Controller 124 comprises a device or component that controls GUI 122 to receive input from user 118, and to present information to user 118. Controller 124 is also able to communicate with back end module 114 to navigate a large collection of data.

Back end module 114 has access to a data collection 150. Data collection 150 comprises any large collection of data that is searchable. For example, data collection 150 may represent the data stored in one or more databases 151-153. Back end module 114 includes a scoring engine 132, which is a device or component that determines the relevance between data in the data collection 150 based on one or more quantitative metrics. These metrics may reflect similarity, difference, relevance, novelty, timeliness, etc. According to the embodiments herein, the "data" in data collection 150 is separated into "data elements". A data element is a fundamental set of meaningful information, such as a file, a document, an image, an article, a record, a term, etc. Scoring engine 132, or another system not shown in FIG. 1, may separate data collection 150 into the individual data elements. As an example, data collection 150 may include data from an employee database for an enterprise. Scoring engine 132 may identify employee records that indicate an employee name, department, work number, email address, mailing address, etc. The employee records may be separated into discrete data elements by scoring engine 132.

Scoring engine 132 may also determine the relevance between the data elements in data collection 150. The relevance between data elements indicates how closely connected one data element is to another data element. An individual data element may have a relationship or connection to other data elements in data collection 150. The relationship may be determined based on common attributes between the data elements. For example, if an individual data element comprises an article published in a technical journal, then this data element may have a relationship with other data elements for the author(s) of the article. In another example, if an individual data element comprises a record for an employee, then this data element may have a relationship with other data records for employees within the same department. The relationships between data elements may depend on any desired algorithms or theories, input from subject matter experts, or any other criteria as desired.

Figure 2:
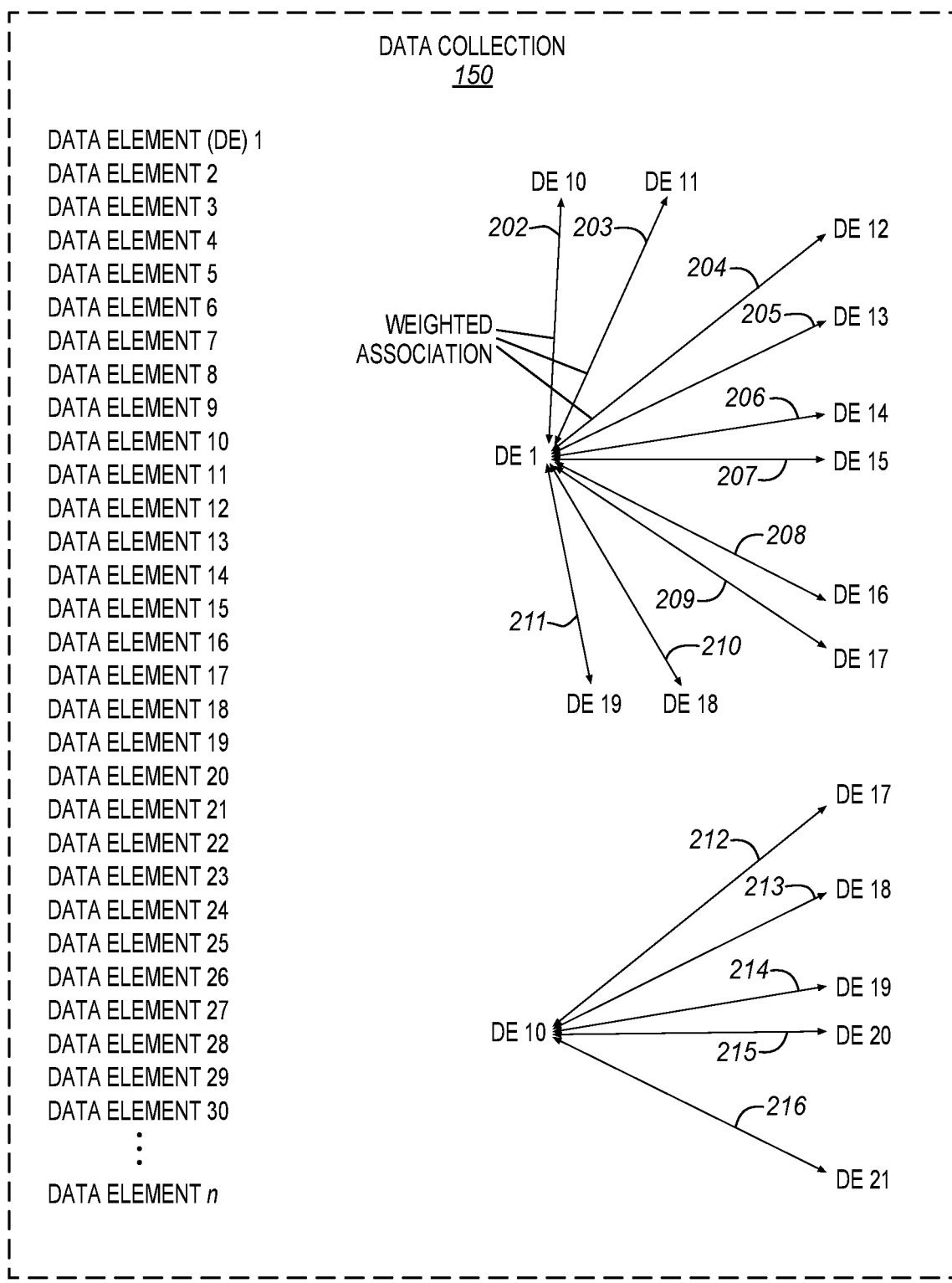
FIG. 2 illustrates a data collection separated into data elements in an exemplary embodiment.

FIG. 2 illustrates data collection 150 separated into data elements in an exemplary embodiment. In this embodiment, data collection 150 has been separated into individual data elements 1-$n$. Scoring engine 132 (see FIG. 1) may process the data elements to determine the relevance between the data elements. In such an example, scoring engine 132 may identify an association between the data elements, and assign a relevance score to the association between the data elements. For example, scoring engine 132 may determine that data element (DE) 1 has an association with data elements 10-19 as shown in FIG. 2. Scoring engine 132 may also determine that data element 10 has an association with data elements 17-21 as shown in FIG. 2. Scoring engine 132 may identify associations for each data element in data collection 150. Scoring engine 132 may also assign a relevance score or weighted value to the associations between the data elements. The relevance score indicates the "strength" of the association between data elements. In other words, the relevance score indicates how relevant one data element is to another. For example, assume that data elements 10-30 comprise employee records for a company. If the employee indicated in data element 10 and the employees indicated in data elements 17-18 work on the same team, in the same department, and in the same division of the company, then a high relevance score may be assigned to the associations between data element 10 and data elements 17-18. If the employee indicated in data element 10 and the employees indicated in data elements 19-20 work in the same department and in the same division of the company (but not on the same team), then a lower relevance score may be assigned to the associations between data element 10 and data elements 19-20. If the employee indicated in data element 10 and the employee indicated in data element 21 work in the same division of the company (but not on the same team or same department), then an even lower relevance score may be assigned to the association between data element 1 and data element 21.

When a relevance score is assigned to an association between data elements in this manner, the association between the data elements may be referred to as a weighted association. FIG. 2 illustrates weighted associations 202-211 between data element 1 and data elements 10-19, respectively. FIG. 2 also illustrates weighted associations 212-216 between data element 10 and data elements 17-21, respectively. Scoring engine 132 may generate weighted associations for each of the data elements 1-$n$ (if applicable).

In the embodiments described below, front end module 112 (see FIG. 1) interacts with user 118 to assist in navigating through data collection 150. As a preview, user 118 selects an "anchor" or "focus" of inquiry for navigating through data collection 150. Front end module 112 will identify data elements that are relevant to the anchor, and graphically display the data elements that are relevant to the anchor so that their relevance to the anchor is visually apparent to user 118. For example, front end module 112 may display the data elements having the most relevance in a bigger size than the data elements having the least relevance. That way, user 118 can "see" the relevance of the data elements to the anchor. An exemplary method of operating front end module 112 is further illustrated in FIG. 3.

Figure 3:
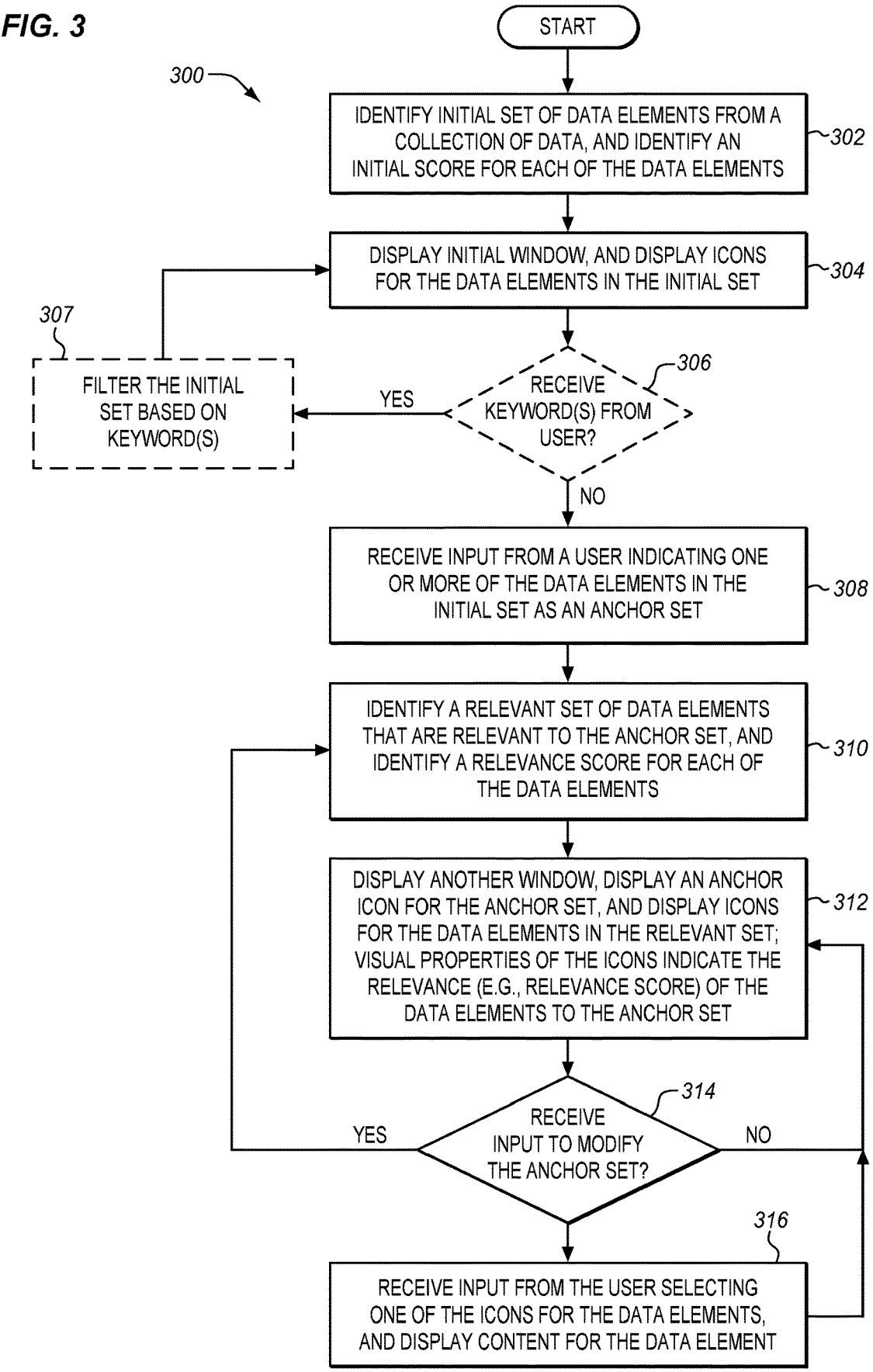
FIG. 3 is a flow chart illustrating a method for navigating a data collection in an exemplary embodiment.

FIG. 3 is a flow chart illustrating a method 300 for navigating data collection 150 in an exemplary embodiment. The steps of method 300 will be described with reference to augmented intelligence system 110 in FIG. 1, but those skilled in the art will appreciate that method 300 may be performed in other systems. Also, the steps of the flow charts described herein are not all inclusive and may include other steps not shown, and the steps may be performed in an alternative order.

Initially, there is no anchor selected by user 118 for exploring data collection 150 (i.e., an empty anchor set). Therefore, front end module 112 interacts with user 118 to select an anchor. To do so, controller 124 identifies an initial set of data elements from data collection 150 for presentation to user 118 as potential anchors for exploring the data collection 150 (step 302). Controller 124 also identifies an initial score for each of the data elements in the initial set (step 302). To identify the initial set and the initial scores, controller 124 may send a query to back end module 114. Back end module 114 (or another system) may predefine scores for the data elements before receiving any input from user 118. The predefined scores are referred to as "initial" scores. The initial score for a data element indicates a relevance of the data element to data collection 150 as a whole. Back end module 114 may use one or more metrics or functions to assign an initial score to each data element in the initial set. For example, if one of the metrics used is a word count, then the initial score may indicate the number of times a word is used within data collection 150.

Figure 4:
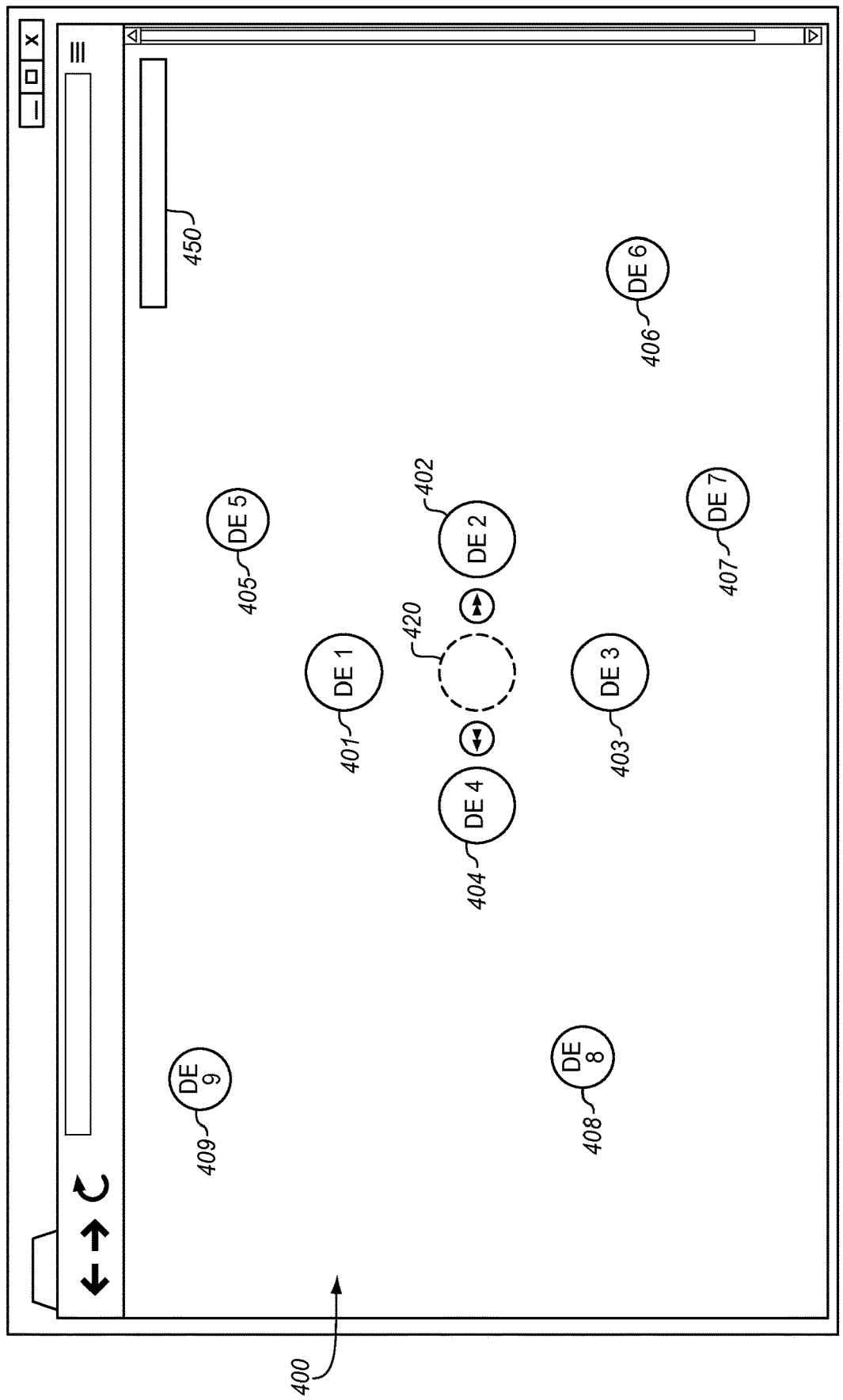
FIG. 4 illustrates an anchor selection window displayed by a GUI for selecting an anchor set in an exemplary embodiment.

In response to commands from controller 124, GUI 122 displays an anchor selection window (step 304). FIG. 4 illustrates an anchor selection window 400 displayed by GUI 122 for selecting an anchor set in an exemplary embodiment. The format of anchor selection window 400 in FIG. 4 is just one example, and may vary as desired. For anchor selection window 400, GUI 122 displays a virtual object 420 that allows user to select one or more data elements as an initial anchor set. Virtual object 420 may be positioned toward the center of anchor selection window 400 as shown in FIG. 4. GUI 122 also displays data element icons 401-409 for the initial set of data elements in anchor selection window 400 (step 304). Data element icons 401-409 may be displayed at radial positions around virtual object 420 as shown in FIG. 4. The visual properties of the data element icons 401-409 may indicate the magnitude of the initial score of the data elements in the initial set. In one embodiment, GUI 122 may display the data element icons 401-409 in different sizes to indicate the initial scores. For example, for data elements that have the highest initial score, GUI 122 may display their data element icons 401-409 in the largest size. As the initial scores become lower, GUI 122 may display their data element icons 401-409 in a smaller size. In another embodiment, GUI 122 may display the data element icons 401-409 at a different position relative to virtual object 420 to indicate the initial scores. For example, for data elements that have the highest initial score, GUI 122 may display their data element icons 401-409 closer to virtual object 420. As the initial scores become lower, GUI 122 may display their data element icons 401-409 a further distance away from virtual object 420.

GUI 122 may optionally provide a dialog or text box 450 in anchor selection window 400 for prompting user 118 to enter one or more keywords or terms. If GUI 122 receives input from user 118 indicating one or more keywords (optional step 306), then controller 124 may filter the initial set of data elements based on the keyword(s) (optional step 307). GUI 112 may then re-display anchor selection window 400 to user 118 (step 304). GUI 122 displays data element icons 401-409 within anchor selection window 400 representing the data elements of the initial set that are filtered based on the keyword(s). With anchor selection window 400 provided to user 118, GUI 122 receives input from user 118 indicating one or more data elements in the initial set as an anchor set (step 308). An "anchor set" is the focal point of interest for user 118 in navigating data collection 150 to identify other data elements that are relevant. The anchor set may comprise one or more data elements as selected by user 118, such as a term, a file, a document, an image, a record, etc. To select an anchor set, GUI 122 allows user 118 to drag-and-drop one or more of the data element icons 401-409 into virtual object 420. For example, user 118 may drag-and-drop data element icon 401 into virtual object 420. This action by user 118 designates data element 1 as the anchor set for an initial inquiry. User 118 may drag-and-drop multiple data element icons 401-409 into virtual object 420 to select data elements for the anchor set.

In FIG. 3, after receiving the input from the user, controller 124 identifies a relevant set of data elements from data collection 150 that are relevant to the anchor set (step 310). Controller 124 also identifies a relevance score for each of the data elements in the relevant set (step 310). To identify the relevant set and the relevance scores, controller 124 may send a query to back end module 114. Back end module 114 (or another system) may calculate or determine scores for the data elements based on the anchor set selected by user 118. The relevance score for a data element indicates a relevance of the data element in the relevant set to the anchor set. Back end module 114 may use one or more metrics or functions to assign the relevance score to each data element in the relevant set.

In response to the commands from controller 124, GUI 122 displays a results window (step 312). GUI 122 displays an anchor icon for the anchor set within the results window (step 312). GUI 122 also displays data element icons for the data elements in the relevant set within the window (step 312). The visual properties of the data element icons within the results window indicate the relevance of the data elements in the relevant set to the anchor set. In other words, the attributes, characteristics, or features of a data element icon, which are perceptible by user 118 through viewing, indicate the relevance or the magnitude of the relevance score of a data element to the anchor set. In one embodiment, GUI 122 may display data element icons in different sizes based on the relevance scores. In an example, for data elements that have the largest relevance score, GUI 122 may display their data element icons in the largest size. As the relevance scores become weaker for data elements, GUI 122 may display their data element icons in a smaller size. In another embodiment, GUI 122 may display data element icons at a different position relative to the anchor icon based on the relevance scores. In an example, for data elements that have the highest relevance scores, GUI 122 may display their data element icons closest to the anchor icon. As the relevance scores become lower, GUI 122 may display their data element icons a further distance away from the anchor icon. GUI 122 may vary the appearance of the data element icons in any desired manner to indicate relevance to user 118. GUI 122 may additionally or alternatively use shape, font size, font color, etc., to indicate different relevance scores.

Figure 5:
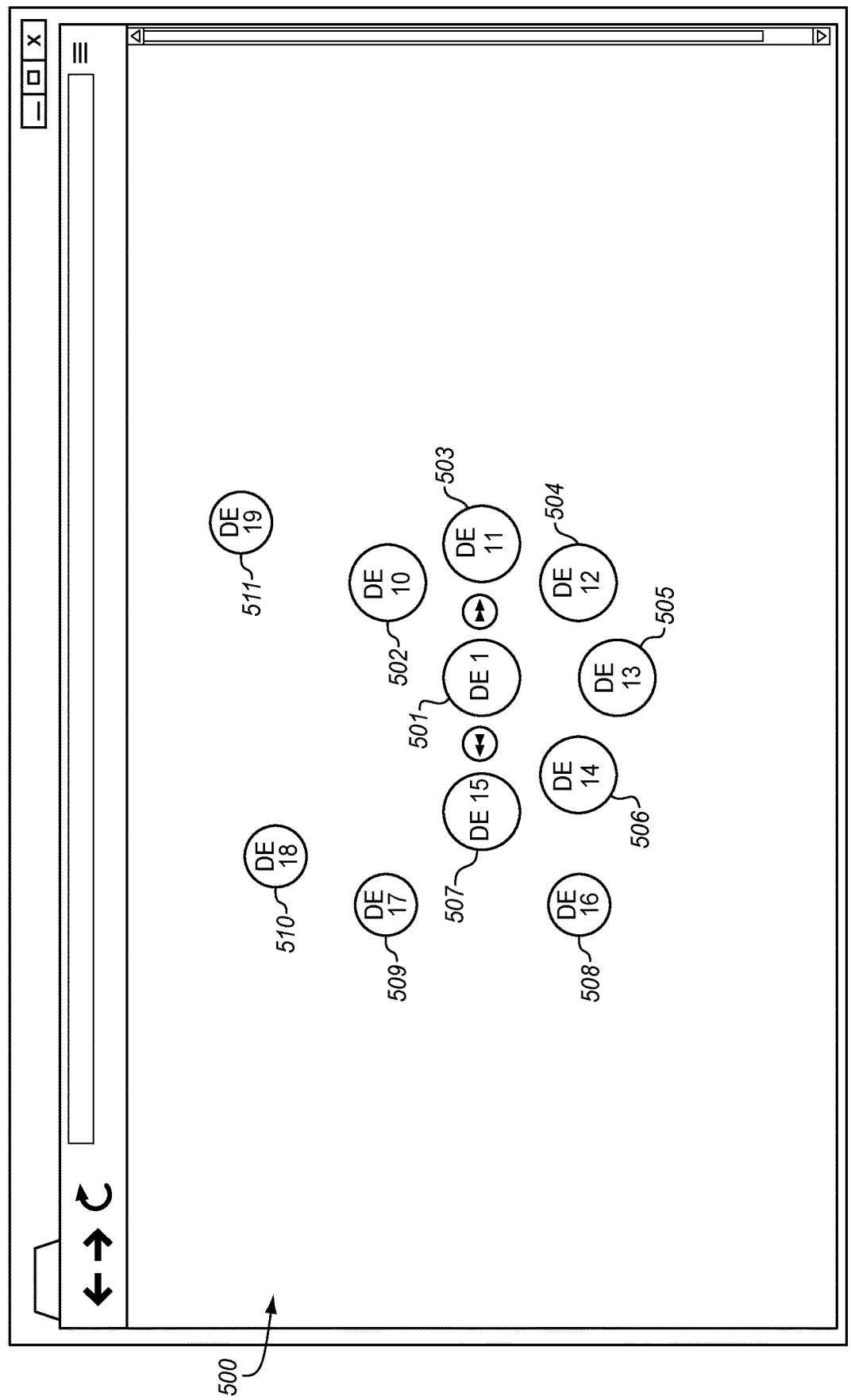
FIG. 5 illustrates a results window displayed by a GUI for presenting data elements to a user in an exemplary embodiment.

FIG. 5 illustrates a results window 500 displayed by GUI 122 for presenting the data elements of the relevant set to user 118 in an exemplary embodiment. The format of results window 500 is just one example, and may vary as a matter of design choice. Assume for this example that user 118 selected data element 1 as a data element for the anchor set. GUI 122 displays an anchor icon 501 in results window 500 for the anchor set (data element (DE) 1). GUI 122 may display anchor icon 501 toward the center of results window 500 as shown in FIG. 5, as data element 1 is the focus of this inquiry. GUI 122 also displays data element icons 502-511 in results window 500 for the data elements in the relevant set. As shown in FIG. 2, data elements 10-19 have an association with data element 1. Therefore, GUI 122 displays a data element icon 502-511 for these data elements. GUI 122 may display data element icons 502-511 at radial positions around anchor icon 501 as shown in FIG. 5. Anchor icon 501 and data element icons 502-511 are displayed as circular bubbles in this embodiment, but could have any desired shape. Anchor icon 501 and data element icons 502-511 may contain a description of their associated data elements, such as a term, phrase, title, thumbnails, etc. Anchor icon 501 may have a different shape than data element icons 502-511 in other embodiments.

The visual properties of the data element icons 502-511 indicate the relevance of data elements 10-19, respectively, to the anchor set (DE 1) represented by anchor icon 501. For example, data element icons 502-507 are displayed as having the largest size, and data element icons 508-511 are displayed as having a smaller size. The size of data element icons 502-511 may indicate the relevance of their corresponding data elements to the anchor set. Because data element icons 502-507 are the largest, data elements (DE) 10-15 have the strongest association with data element 1. Because data element icons 508-511 are smaller, data elements (DE) 16-19 have a weaker association with data element 1.

The positions of data element icons 502-511 relative to anchor icon 501 may additionally or alternatively indicate the relevance of their corresponding data elements to the anchor set. GUI 122 may display data element icons 502-507 at radial positions around anchor icon 501, where the radial position (e.g., distance) indicates relevance. Data element icons 502-507 are displayed closest to anchor icon 501, and therefore, data elements (DE) 10-15 have the strongest association with data element 1. Data element icons 508-511 are displayed farther from anchor icon 501, and therefore, data elements (DE) 16-19 have a weaker association with data element 1. There may not be room in results window 500 to show all of the data element icons the same distance from anchor icon 501, even though their corresponding data elements have the same relevance scores. Thus, a combination of size and position may be used to indicate relevance.

Due to the visual properties of data element icons 502-507, user 118 can see that they are the most relevant to the anchor set. Thus, front end module 112 is suggesting which data elements are likely to satisfy the inquiry of user 118. Data element icons 502-511 may be selectable by user 118 to view the data elements represented by the data element icons 502-511. GUI 122 may receive input from user 118 selecting one of the data element icons 502-511 (step 314). In response to the selection, GUI 122 may display the content of the data element represented by the selected data element icon (step 314). For example, user 118 may select the data element icon 502 to view the actual content of the data element (DE 10). If data element 10 is an employee record, then GUI 122 will display the content of employee record to user 118.

In FIG. 3, GUI 122 may receive input from user 118 selecting one or more data element icons 502-511 within results window 500 to modify or change the anchor set (step 316). A change to the anchor set acts to refine the focus of inquiry into data collection 150. The newly selected data elements may be added to the initial anchor set to create a modified anchor set. In FIG. 5, for example, GUI 122 may allow user 118 to drag-and-drop one or more of the data element icons 502-511 into anchor icon 501. If user 118 drags the data element icon 502 into anchor icon 501, then this action designates data element 1 and data element 10 as the modified anchor set. Method 300 (in FIG. 3) may then repeat from step 310 with the modified anchor set. For example, controller 124 identifies an adjusted relevant set of data elements from data collection 150 that are relevant to the modified anchor set (step 310). Controller 124 also identifies a relevance score for each of the data elements in the adjusted relevant set (step 310). To identify the adjusted relevant set and the relevance scores, controller 124 may send another query to back end module 114. Back end module 114 (or another system) may calculate or determine scores for the data elements based on the modified anchor set selected by user 118.

In response to the commands from controller 124, GUI 122 displays another results window (step 312). GUI 122 displays an anchor icon for the modified anchor set within the results window (step 312). GUI 122 also displays data element icons for the data elements in the adjusted relevant set within the results window (step 312). The visual properties of the data element icons within the results window indicate the relevance of the data elements in the adjusted relevant set to the modified anchor set (step 312).

Figure 6:
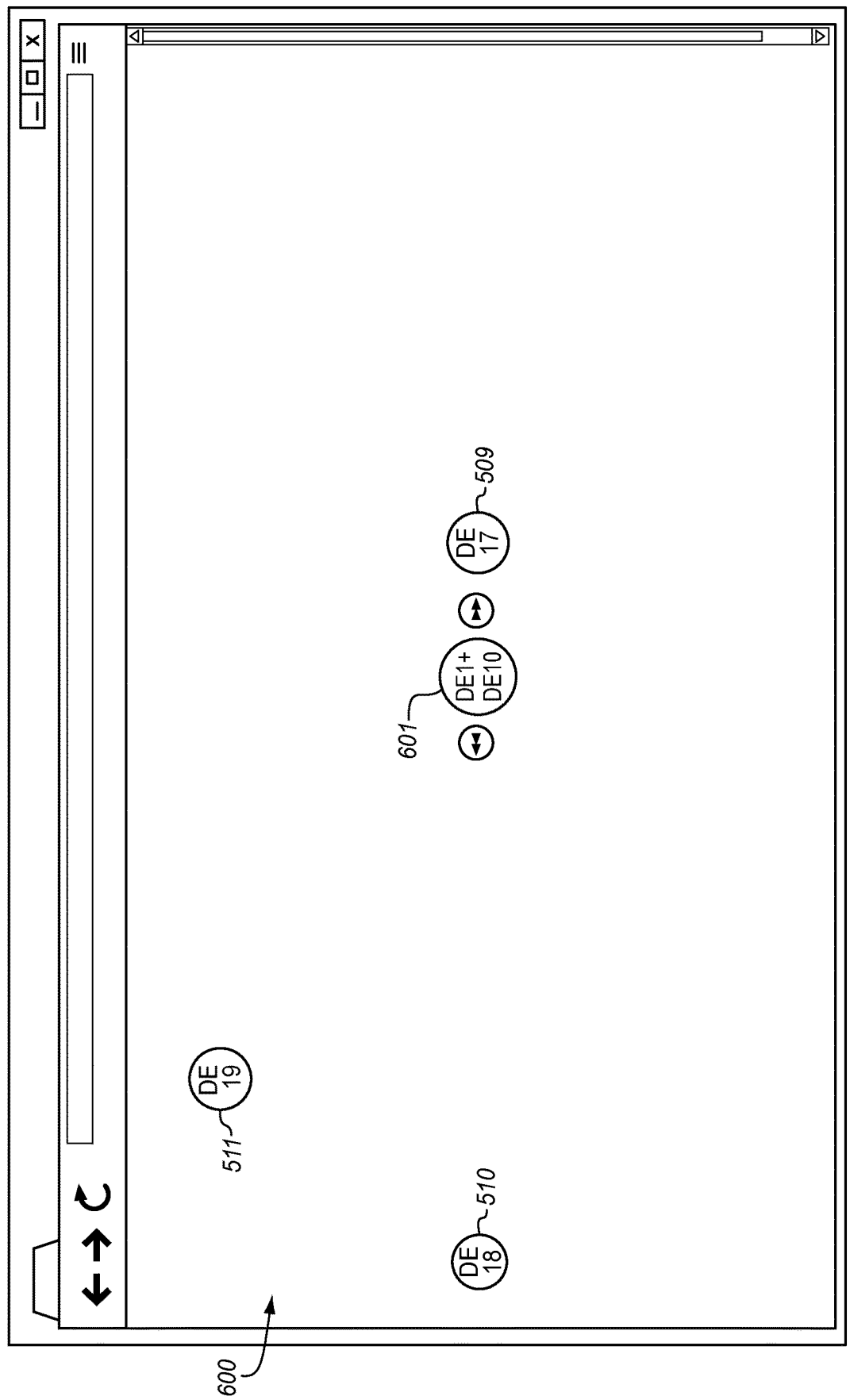
FIG. 6 illustrates a results window displayed by a GUI for presenting data elements to a user in another exemplary embodiment.

FIG. 6 illustrates a results window 600 displayed by GUI 122 for presenting the data elements in the adjusted relevant set to user 118 in another exemplary embodiment. The format of results window 600 is just one example, and may vary as a matter of design choice. User 118 has selected data element 1 and data element 10 as the modified anchor set. GUI 122 displays an anchor icon 601 in results window 600 for the modified anchor set. GUI 122 also displays the data element icons 509-511 in results window 600 for the data elements in the adjusted relevant set. As shown in FIG. 2, data element 1 has an association with data elements 17-19, and data element 10 also has an association with data elements 17-19. Therefore, GUI 122 displays data element icons 509-511 for these data elements. As in the above embodiment, the visual properties of the data element icons 509-511 indicate the relevance of data elements 17-19, respectively, to data element 1 and data element 10 (e.g., size, position, etc).

GUI 122 may maintain the size of data element icons 509-511 within results window 600 to indicate the relevance of the data elements in the adjusted relevant set to the initial anchor set (i.e., data element 1). GUI 122 may vary a position of the data element icons 509-511 in relation to anchor icon 601 to indicate the relevance of the data elements in the adjusted relevant set to the modified anchor set. In FIG. 5, for instance, GUI 122 displays the data element icons 509-511 for data elements 17-19 at a certain size in results window 500 to indicate the relevance of data elements 17-19 to the initial anchor set. In FIG. 6, GUI 122 maintains the size of data element icons 509-511, but adjusts the position of data element icons 509-511 within results window 600 to indicate the relevance of data elements 17-19 to the modified anchor set. For example, GUI 122 displays data element icon 509 closer to anchor icon 601 to indicate that data element 17 is more relevant to data elements 1 and 10, than to data element 1 alone (see FIG. 5). GUI 122 also displays data element icons 510-511 farther away from anchor icon 601 to indicate that data elements 18-19 are less relevant to data elements 1 and 10, than to data element 1 alone (see FIG. 5).

User 118 may modify the anchor set multiple times to refine the inquiry. Each time the anchor set is modified, front end module 112 will again identify data elements that are relevant to the modified anchor set, identify relevance scores for the data elements in relation to the modified anchor set, and display the data elements to user 118. Thus, user 118 may iteratively refine the inquiry in response to seeing the data elements reported for anchor set. This iterative process helps user 118 navigate through the large data collection 150 to find the information he/she is looking for.

The data within data collection 150 may also be sorted into different categories. A category of data is a division of the data having particular shared characteristics. For example, the data for an enterprise may be sorted into categories of "people", "documents", and "terms". Front end module 112 may identify data elements that are relevant to the anchor set for each of the categories. In other words, front end module 112 may identify data elements that have an association with the anchor set in a first category, may identify data elements that have an association with the anchor set in a second category, may identify data elements that have an association with the anchor set in a third category, etc.

Figure 7:
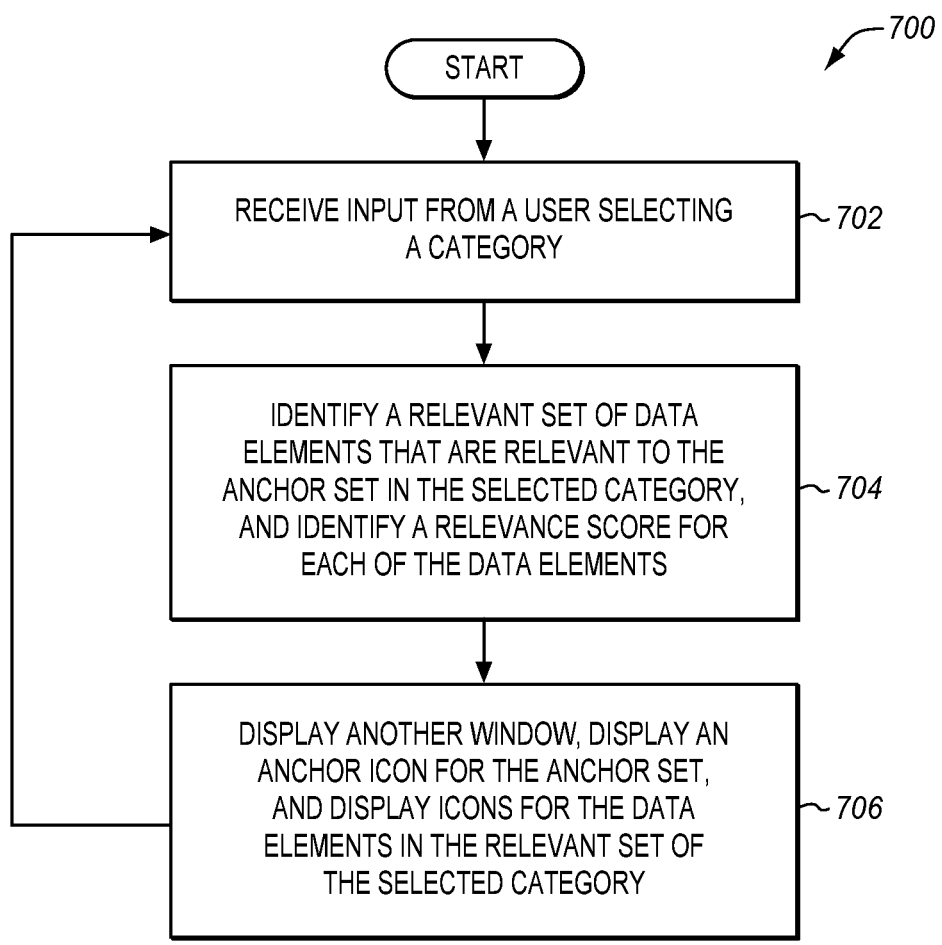
FIG. 7 is a flow chart illustrating a method for displaying different categories of data elements in an exemplary embodiment.

FIG. 7 is a flow chart illustrating a method 700 for displaying different categories of data elements in an exemplary embodiment. The steps of method 700 will be described with reference to augmented intelligence system 110 in FIG. 1, but those skilled in the art will appreciate that method 700 may be performed in other systems. GUI 122 receives input from user 118 selecting a category of data element (step 702). Controller 124 identifies a relevant set of data elements in the selected category (step 704). In response to the commands from controller 124, GUI 122 displays a results window (step 706). GUI 122 displays an anchor icon for the anchor set within the results window (step 706). GUI 122 also displays data element icons for the data elements in the relevant set of the selected category (step 706).

Figure 8:
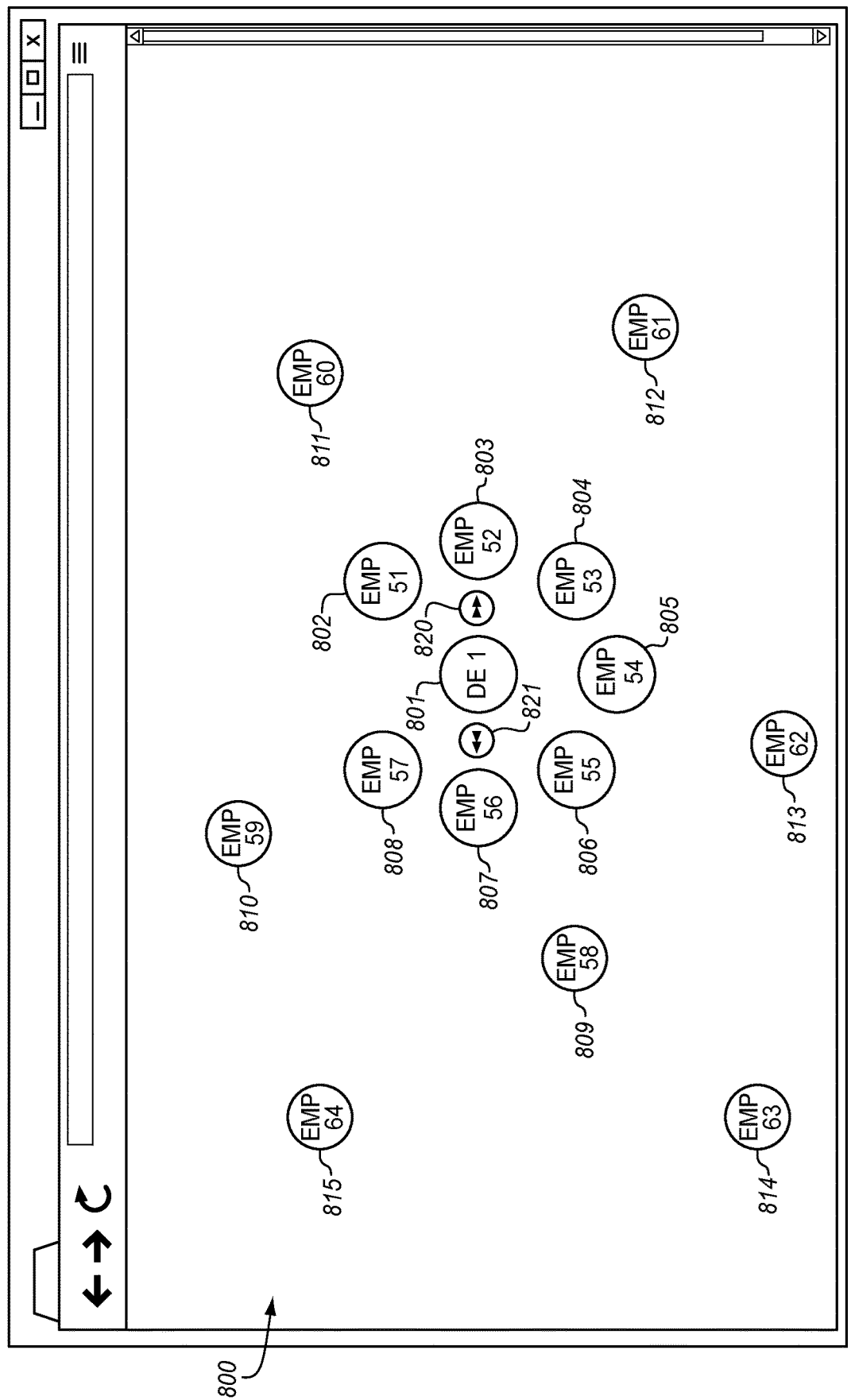
FIG. 8 illustrates a results window displayed by a GUI for presenting data elements of the "employees" category in an exemplary embodiment.
Figure 9:
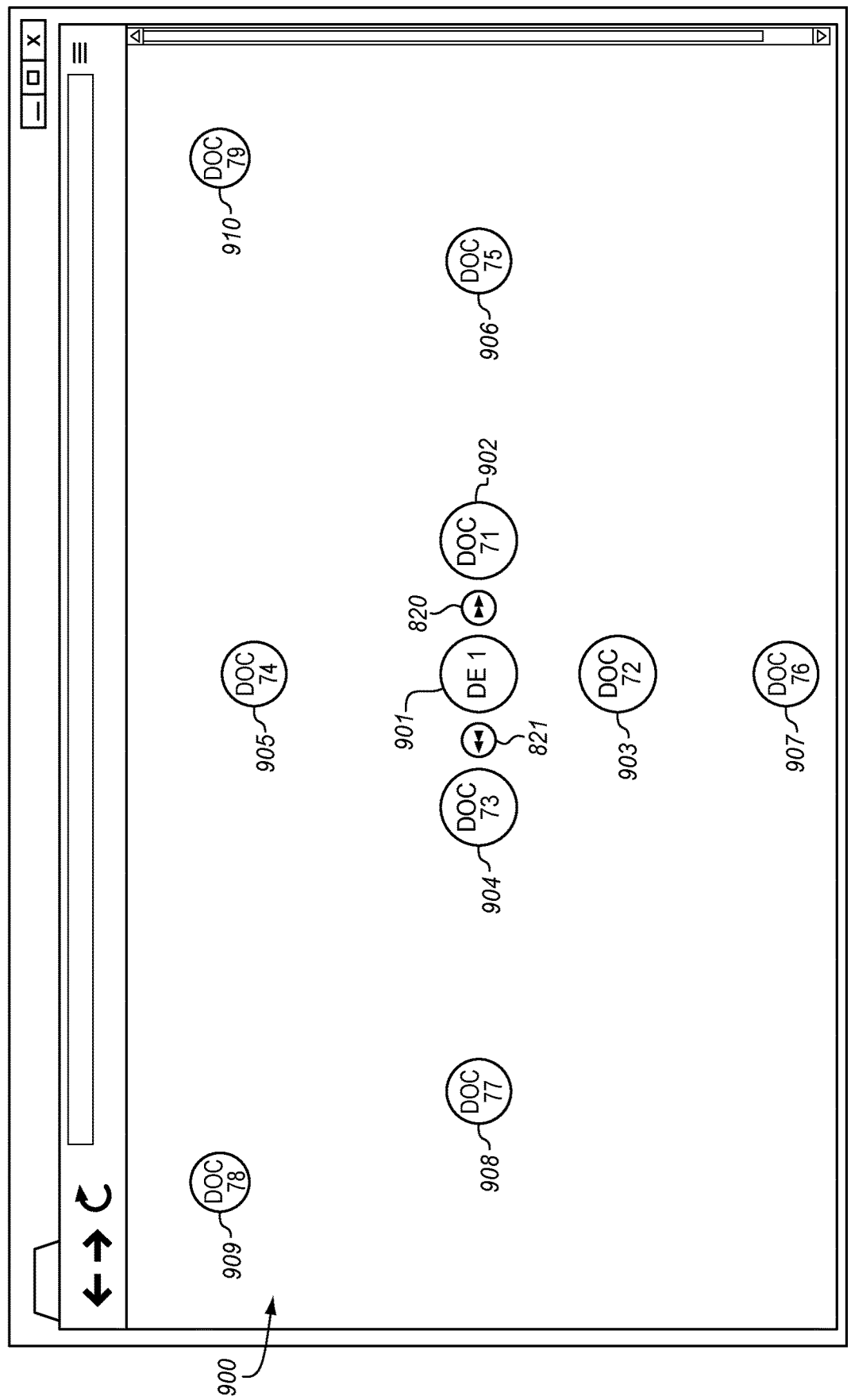
FIG. 9 illustrates a results window displayed by a GUI for presenting data elements of the "documents" category in an exemplary embodiment.
Figure 10:
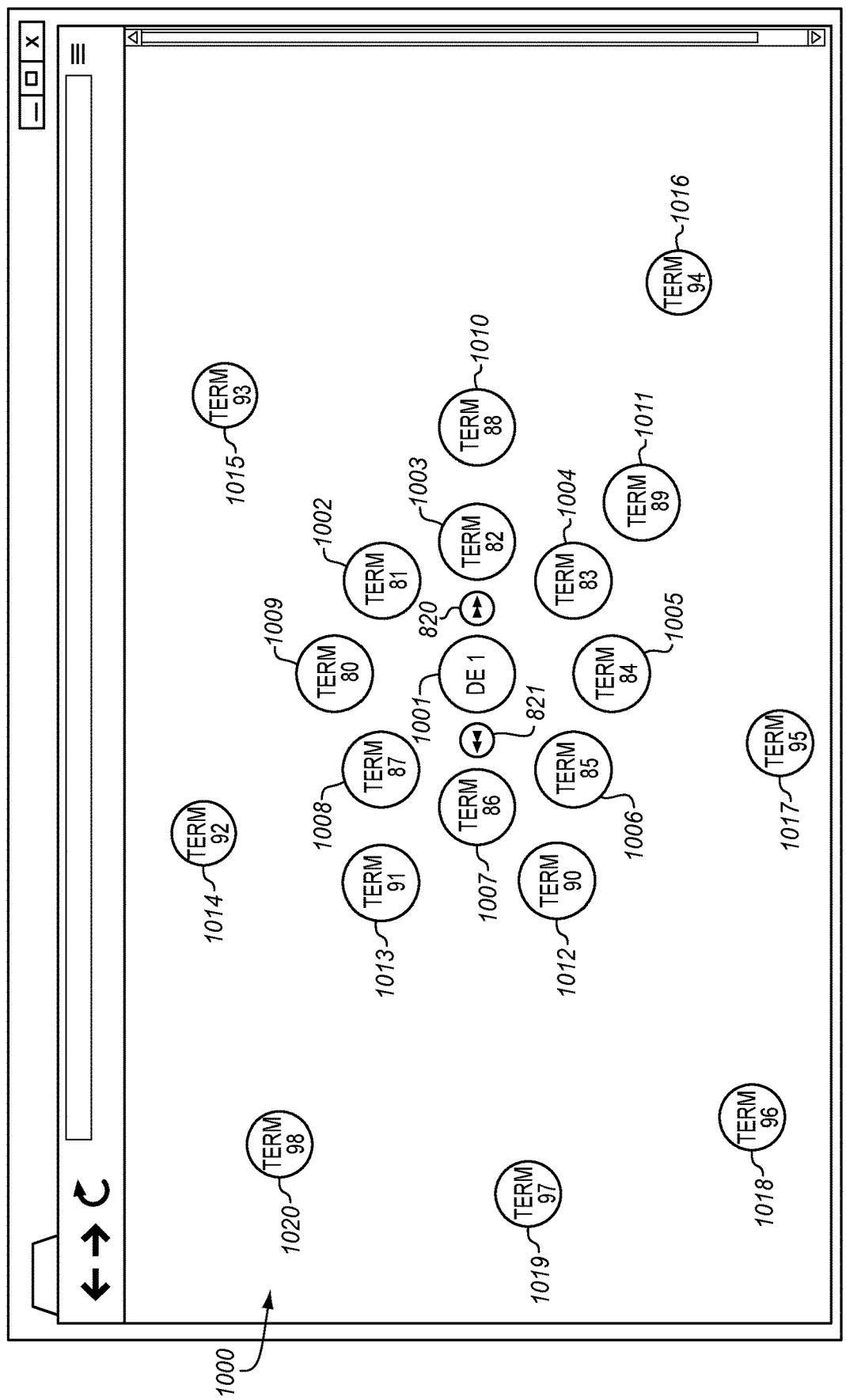
FIG. 10 illustrates a results window displayed by a GUI for presenting data elements of the "terms" category in an exemplary embodiment.

FIGS. 8-10 illustrate windows displayed by GUI 122 for presenting the data elements to user 118 in different categories in an exemplary embodiment. Although not evident in FIGS. 8-10, the data element icons for different categories may be displayed in different colors. In the example shown in FIGS. 8-10, the categories are "employees", "documents", and "terms". FIG. 8 illustrates a results window 800 displayed by GUI 122 for presenting data elements of the "employees" category in an exemplary embodiment. It is assumed for FIG. 8 that user 118 has selected the "employees" category of data elements. GUI 122 displays an anchor icon 801 in results window 800 for the anchor set, which is data element 1 in this example. As shown in FIG. 8, data element 1 has an association with the data elements for employees (EMP) 51-64. Therefore, GUI 122 displays data element icon 802-815 in results window 800 for these data elements. As in the above embodiments, the visual properties of the data element icons 802-815 indicate the relevance of the data elements for employees (EMP) 51-64 (e.g., size, position, etc.). FIG. 8 also shows control icons 820-821. GUI 122 displays control icon 820 to allow user 118 to toggle through the different windows for the different categories. If user 118 selects control icon 820, then GUI 122 will switch to another window that shows a different category, which is shown in FIG. 9. If user 118 selects control icon 821, then GUI 122 will return to the previous window.

FIG. 9 illustrates a results window 900 displayed by GUI 122 for presenting data elements of the "documents" category in an exemplary embodiment. It is assumed for FIG. 9 that user 118 has selected the "documents" category of data elements. GUI 122 displays an anchor icon 901 in results window 900 for the anchor set, which is data element 1 in this example. As shown in FIG. 9, data element 1 has an association with the data elements for documents (DOC) 71-79. For example, the documents may be patents, trademarks, articles, technical journals, etc., that are relevant to data element 1. GUI 122 displays data element icons 902-910 in results window 900 for these related data elements. As in the above embodiments, the visual properties of the data element icons 902-910 indicate the relevance of the data elements for documents (DOC) 71-79 (e.g., size, position, etc.). If user 118 selects control icon 820 again, then GUI 122 will switch to another window that shows a different category, which is shown in FIG. 10.

FIG. 10 illustrates a results window 1000 displayed by GUI 122 for presenting data elements of the "terms" category in an exemplary embodiment. It is assumed for FIG. 10 that user 118 has selected the "terms" category of data elements. GUI 122 displays an anchor icon 1001 in results window 1000 for the anchor data element, which is data element 1 in this example. As shown in FIG. 10, data element 1 has an association with the data elements for terms 80-98. For example, the terms may be relevant to data element 1, such as "communication", "service", "network", "transmission", "packet", "optical", "mobile", "traffic", etc. GUI 122 displays a data element icon 1002-1020 for these data elements. As in the above embodiments, the visual properties of the data element icons 1002-1020 indicate the relevance of the data elements for terms 80-98 (e.g., size, position, etc.). If user 118 selects control icon 820 again, then GUI 122 will switch to another window that shows a different category, such as back to window 800 in FIG. 8, or to another window that shows a different category.

Front end module 112 may also allow user 118 to view how a data element is relevant to the anchor set. For example, if a data element has a high relevance score, then user 118 may want to see the connections or links between this data element and the anchor set that lead to the high relevance score.

Figure 11:
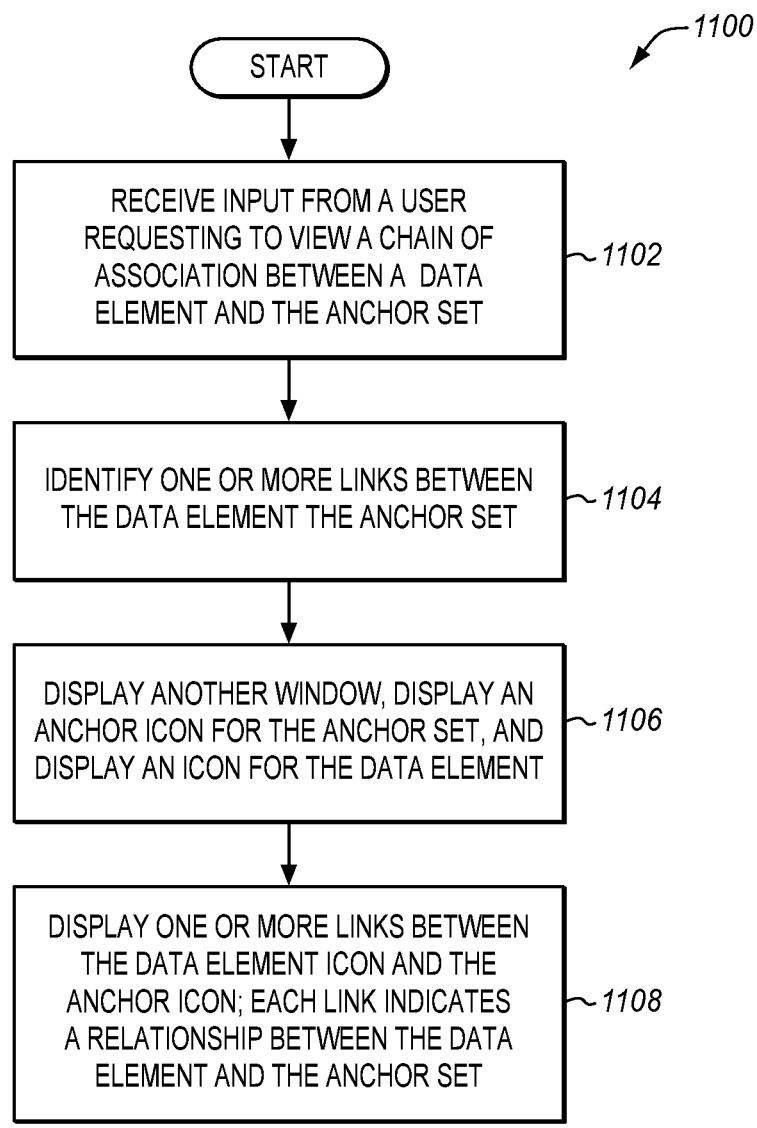
FIG. 11 is a flow chart illustrating a method for displaying a chain of association between a data element and an anchor set in an exemplary embodiment.

FIG. 11 is a flow chart illustrating a method 1100 for displaying a chain of association between a data element and the anchor set in an exemplary embodiment. The steps of method 1100 will be described with reference to augmented intelligence system 110 in FIG. 1, but those skilled in the art will appreciate that method 1100 may be performed in other systems. GUI 122 receives input from user 118 requesting to view a chain of association between a data element and the anchor set (step 1102). Controller 124 identifies one or more links between the data element and the anchor set (step 1104). In response to the commands from controller 124, GUI 122 displays an association window (step 1106). GUI 122 displays an anchor icon for the anchor set with the association window (step 1106). GUI 122 also displays a data element icon for the data element within the association window (step 1106). GUI 122 further displays one or more links between the data element icon and the anchor icon within the association window (step 1108). Each link indicates a relationship between the data element and the anchor set. For example, if the anchor set is regarding a first employee and the data element is regarding a second employee, then one relationship between the data element and the anchor set may be that the first employee and the second employee worked on a common project. Another relationship between the data element and the anchor set may be that the first employee and the second employee co-authored an article. Another relationship between the data element and the anchor set may be that the first employee and the second employee were both inventors on a patent. There may be multiple different relationships between the data element and the anchor set that factored into the relevance score assigned to the anchor set.

Figure 12:
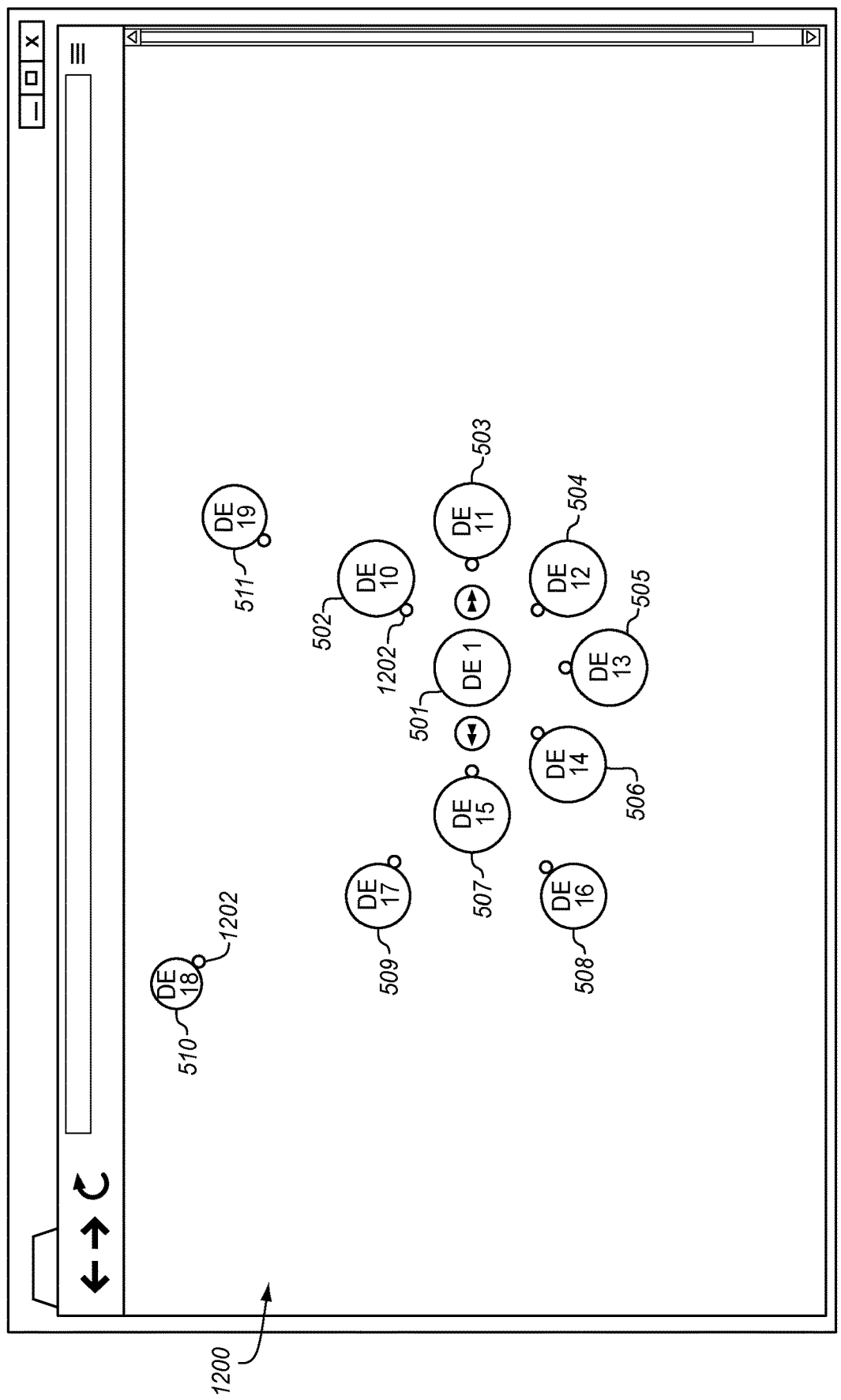
FIG. 12 illustrates a results window with a control icon for displaying a chain of association between data elements in an exemplary embodiment.
Figure 13:
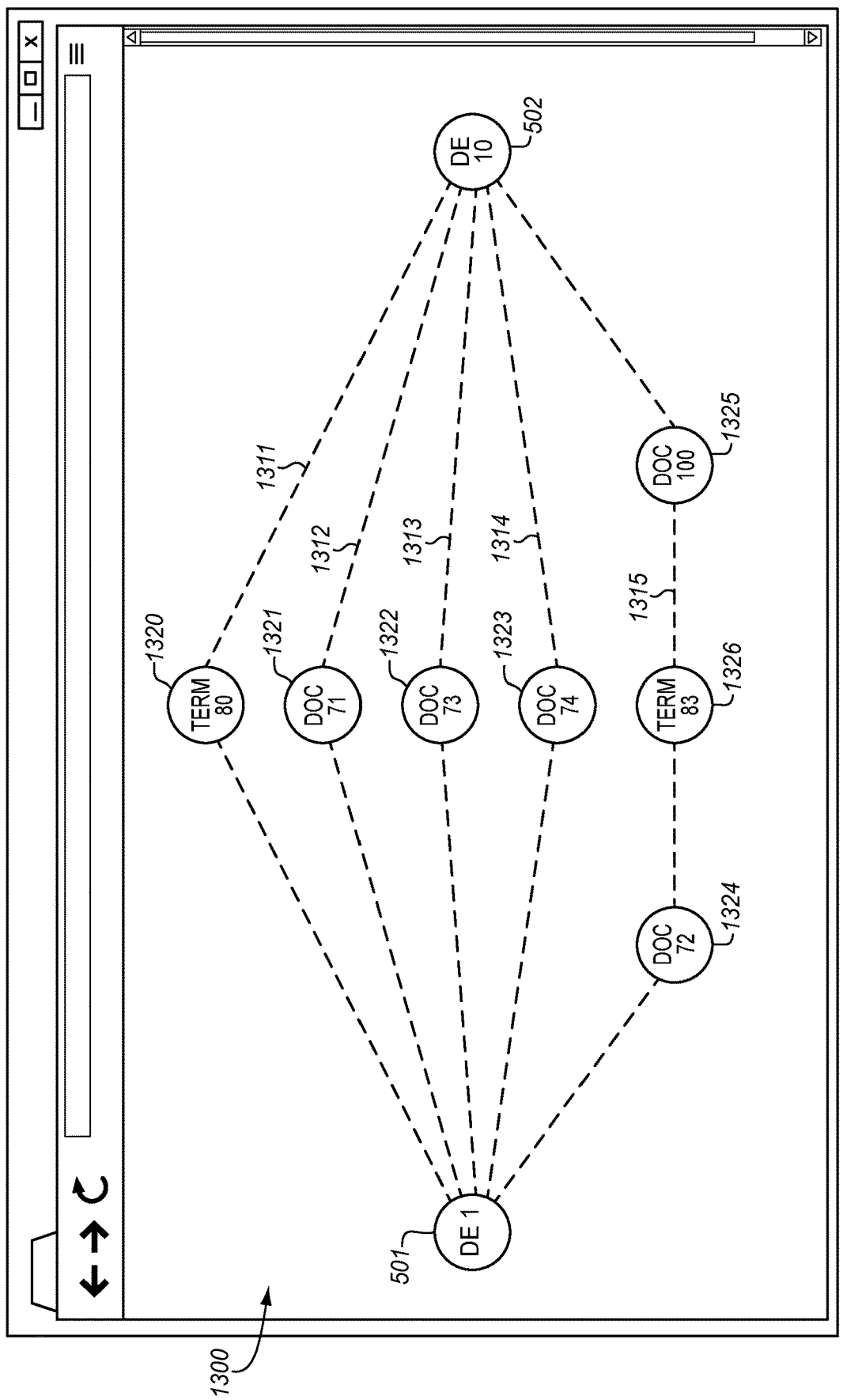
FIG. 13 illustrates an association window displayed by a GUI for presenting a chain of association between data elements in an exemplary embodiment.
Figure 14:
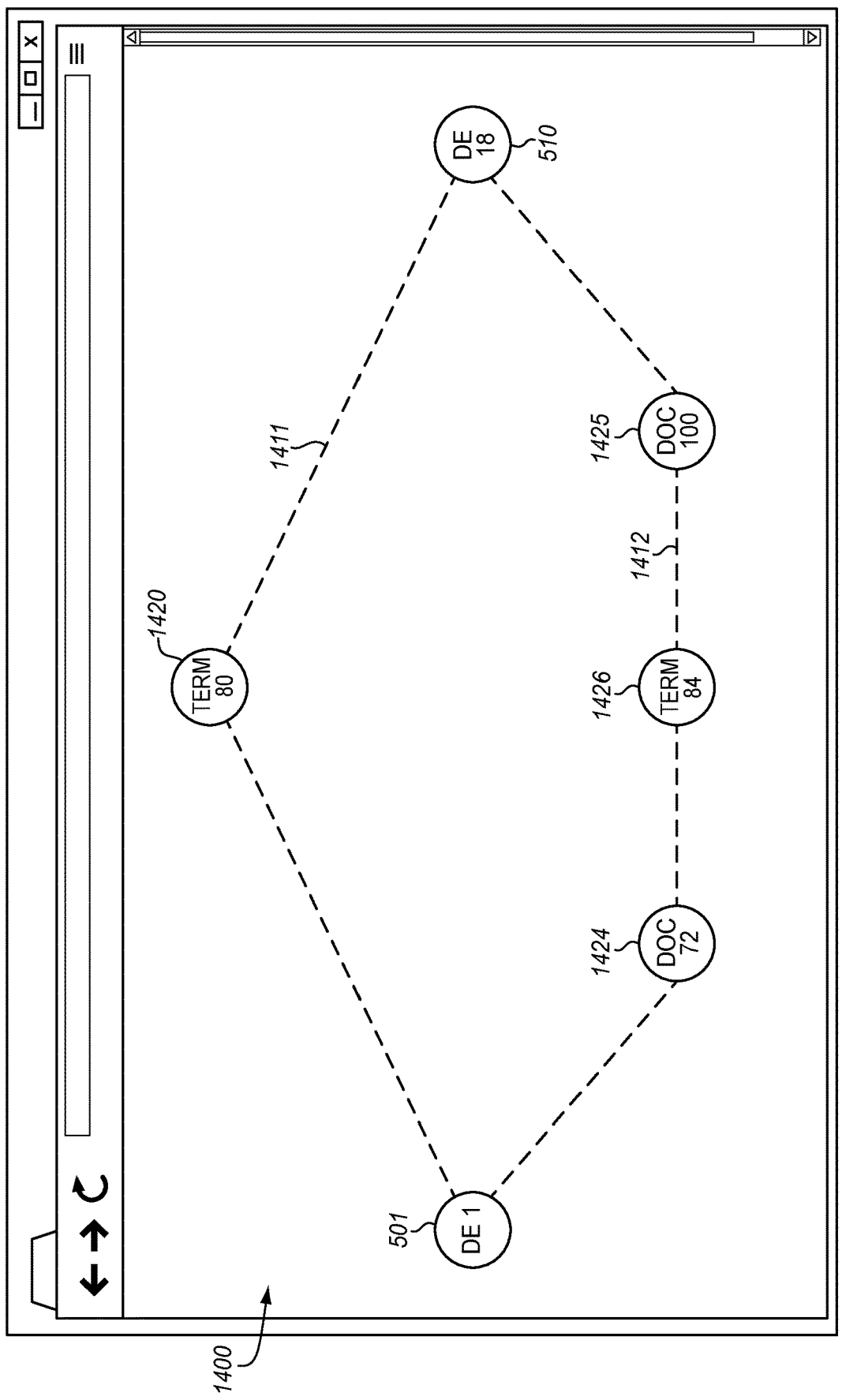
FIG. 14 illustrates an association window displayed by a GUI for presenting a chain of association between data elements in another exemplary embodiment.

FIGS. 12-14 illustrate GUI 122 displaying a chain of association between a data element and the anchor set. FIG. 12 illustrates a results window 1200 with a control icon 1202 for displaying a chain of association between data elements in an exemplary embodiment. Results window 1200 resembles results window 500 in FIG. 5, except that control icon 1202 is included proximate to each of the data element icons 502-511. Control icon 1202 is displayed as a circular bubble that is attached to or proximate to each data element icon 502-511, but the shape and location of control icon 1202 may vary as desired.

Assume that user 118 selects control icon 1202 adjacent to data element icon 502. When this occurs, GUI 122 will display a window that shows the chain of association between data element 1 (i.e., the anchor set) and data element 10 (i.e., the data element selected by user 118), which is shown in FIG. 13. FIG. 13 illustrates an association window 1300 displayed by GUI 122 for presenting a chain of association between data elements in an exemplary embodiment. For association window 1300, GUI 122 displays anchor icon 501 for the anchor set, which is data element 1 in this example. GUI 122 also displays data element icon 502 for the data element selected by user 118, which is data element 10 in this example. GUI 112 displays the chain of association between data element 1 and data element 10 with links 1311-1315. Each link 1311-1315 indicates a relationship between data element 10 and data element 1. These relationships between data element 10 and data element 1 contributed to the relevance score assigned to data element 10 when data element 1 is selected as the anchor set.

In the example shown in FIG. 13, GUI 122 displays five links 1311-1315 between data element icon 501 (for data element 1) and data element icon 502 (for data element 10). The first link 1311 illustrates that data element 1 and data element 10 are related by the data element "term 80", which is displayed as data element icon 1320. In other words, data element "term 80" is common to both data element 1 and data element 10. The second link 1312 illustrates that data element 1 and data element 10 are related by data element "DOC 71", which is displayed as data element icon 1321. The third link 1313 illustrates that data element 1 and data element 10 are related to data element "DOC 73", which is displayed as data element icon 1322. The fourth link 1314 illustrates that data element 1 and data element 10 are related to data element "DOC 74", which is displayed as data element icon 1323. The fifth link 1315 illustrates that data element 1 is related to data element "DOC 72" (displayed as data element icon 1324), data element 10 is related to data element "DOC 100" (displayed as data element icon 1325), and these documents are related by data element "TERM 83" (displayed as data element icon 1326). This chain of association visually shows user 118 how a data element is relevant to the anchor set.

Referring to FIG. 12, assume in another example that user 118 selects control icon 1202 adjacent to data element icon 510. When this occurs, GUI 122 will display a window that shows the chain of association between data element 1 (i.e., the anchor set) and data element 18 (i.e., the data element selected by user 118), which is shown in FIG. 14. FIG. 14 illustrates an association window 1400 displayed by GUI 122 for presenting a chain of association between data elements in an exemplary embodiment. For association window 1400, GUI 122 displays anchor icon 501 for the anchor data element, which is data element 1 in this example. GUI 122 also displays data element icon 510 for the data element selected by user 118, which is data element 18 in this example. GUI 112 displays the chain of association between data element 1 and data element 18 with links 1411-1412. Each link 1411-1412 indicates a relationship between data element 18 and data element 1. These relationships between data element 18 and data element 1 contributed to the relevance score assigned to data element 18 when data element 1 is selected as the anchor set.

In the example shown in FIG. 14, GUI 122 displays two links 1411-1412 between data element icon 501 (for data element 1) and data element icon 510 (for data element 18). The first link 1411 illustrates that data element 1 and data element 18 are related to the data element "term 80", which is displayed as data element icon 1420. The second link 1412 illustrates that data element 1 is related to data element "DOC 72" (displayed as data element icon 1424), data element 18 is related to data element "DOC 100" (displayed as data element icon 1425), and these documents are related by data element "TERM 84" (displayed as data element icon 1426). This chain of association visually shows user 118 how a data element is relevant to the anchor set. By comparing window 1300 to window 1400, it is clear that data element 10 (in FIG. 13) has more "links" or associations with data element 1 (the anchor set) than does data element 18 (in FIG. 14). Because of this, data element 10 will have a higher relevance score than data element 18. As can be seen in FIG. 12, the higher relevance score of data element 10 is visually represented by data element icon 502 being large in size and close in proximity to anchor icon 501. The lower relevance score of data element 18 is visually represented by data element icon 510 being smaller in size and further from anchor icon 501 as compared to data element icon 502.

The score for each data element depends on the members of the anchor set. As such, it is possible to compute the change in ranking that will result by adding a new data element to the anchor set. This information may be useful to user 118, and may be visualized as a "sensitivity" of the ranking to selecting a data element for inclusion in the anchor set. FIG. 15 illustrates a results window 1500 displayed by GUI 122 for presenting the data elements of a relevant set to user 118 in an exemplary embodiment. The format of results window 1500 is just one example, and may vary as a matter of design choice. In this example, the sensitivity of a data element for changing the relevance scores is illustrated by the intensity or shading of the data element icons. As in the above examples, GUI 122 displays an anchor icon 501 in results window 1500 for the anchor set. GUI 122 also displays data element icons 502-511 in results window 1500 for the data elements in the relevant set. The visual properties of a data element icon 502-511 for a data element may further indicate how much the relevance scores will change if the data element is included in the anchor set. For example, data element icons 502-507 are displayed as having the least intensity. Therefore, inclusion of the data elements (DE 10-15), represented by data element icons 502-507, in the anchor set would change the relevance scores of the other data elements the least. Data element icons 508-509 are displayed as having more intensity. Therefore, inclusion of the data elements (DE 16-17), represented by data element icons 508-509, in the anchor set would change the relevance scores of the other data elements more than inclusion of data elements 10-15. Data element icons 510-511 are displayed as having the highest intensity. Therefore, inclusion of the data elements (DE 18-19), represented by data element icons 510-511, in the anchor set would change the relevance scores of the other data elements the most.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

We claim:

1. A system of exploring a collection of data, the system comprising:
    at least one processor and at least one memory configured to implement a controller and a Graphical User Interface (GUI);
    the controller is configured, when no anchor has been selected by a user, to identify an initial set of data elements from the collection of data for presentation to the user as potential anchors for exploring the collection of data, and to identify an initial score for each data element in the initial set, wherein the initial score indicates a relevance of each data element in the initial set to the collection of data;
    the GUI is configured, when no anchor has been selected by the user, to display a first window to the user, and to display data element icons for the data elements in the initial set within the first window, wherein visual properties of the data element icons within the first window indicate the magnitude of the initial score of the data elements in the initial set;
    the GUI is configured to receive input from the user dragging-and-dropping at least one of the data elements in the initial set to an object displayed in the first window to select the at least one of the data elements as an initial anchor set for exploring the collection of data;
    the controller is configured to identify a first relevant set of data elements that are relevant to the initial anchor set, and to identify a first relevance score for each data element in the first relevant set, wherein the first relevance score indicates relevance of each data element in the first relevant set to the initial anchor set;
    the GUI is configured to display a second window to the user, to display an anchor icon for the initial anchor set within the second window, and to display the data element icons for the data elements in the first relevant set within the second window, wherein the visual properties of the data element icons within the second window indicate the magnitude of the first relevance scores of the data elements in the first relevant set.

2. The system of claim 1 wherein:
    the GUI is configured to receive input from the user selecting at least one of the data element icons within the second window to modify the initial anchor set to create a modified anchor set;
    the controller is configured to identify a second relevant set of data elements that are relevant to the modified anchor set, and to identify a second relevance score for each data element in the second relevant set, wherein the second relevance score indicates relevance of each data element in the second relevant set to the modified anchor set;
    the GUI is configured to display a third window, to display the anchor icon for the modified anchor set within the third window, and to display the data element icons for the data elements in the second relevant set within the third window, wherein the visual properties of the data element icons within the third window indicate the magnitude of the second relevance scores of the data elements in the second relevant set.

3. The system of claim 2 wherein:
    the GUI is configured to vary a size of the data element icons within the second window to indicate the magnitude of the first relevance scores of the data elements in the first relevant set.

4. The system of claim 3 wherein:
    the GUI is configured to vary a position of the data element icons in relation to the anchor icon within the third window to indicate the magnitude of the second relevance scores of the data elements in the second relevant set; and
    the GUI is configured to maintain the size of the data element icons within the third window to indicate the relevance of the data elements in the second relevant set to the initial anchor set.

5. The system of claim 1 wherein:
the GUI is configured to receive input from the user through the first window indicating at least one keyword;
the controller is configured to filter the initial set of data elements based on the at least one keyword to generate a filtered initial set of data elements; and
the GUI is configured to display the data element icons for the data elements in the filtered initial set within the first window.

6. The system of claim 1 wherein:
the GUI is configured to display the data element icons within the second window as different sizes based on the first relevance scores of the data elements in the first relevant set.

7. The system of claim 6 wherein:
the GUI is configured to display the data element icons in a largest size within the second window for the data elements in the first relevant set having the first relevance scores that are the highest.

8. The system of claim 1 wherein:
the GUI is configured to display the data element icons within the second window at different positions relative to the anchor icon based on the first relevance scores of the data elements in the first relevant set.

9. The system of claim 8 wherein:
the GUI is configured to display the data element icons in closer proximity to the anchor icon within the second window for the data elements in the first relevant set having the first relevance scores that are the highest.

10. The system of claim 1 wherein:
the GUI is configured to display the anchor icon toward the center of the second window, and to display the data element icons at radial positions around the anchor icon.

11. The system of claim 1 wherein:
the data elements in the first relevant set are sorted into categories;
the GUI is configured to display the data element icons related to a first category in the second window; and
the GUI is configured to display the data element icons related to a second category in a third window.

12. The system of claim 11 wherein:
the GUI is configured to display the data element icons per category in a different color.

13. The system of claim 1 wherein:
the GUI is configured to display the anchor icon and the data element icons as circular bubbles; and
the circular bubbles contain a description of their associated data element.

14. The system of claim 1 wherein:
the GUI is configured to receive input from the user to view a chain of association between the initial anchor set and a first data element of the first relevant set;
the GUI is configured to display a third window, to display the anchor icon within the third window, to display the data element icon representing the first data element within the third window, and to display at least one link between the anchor icon and the data element icon representing the first data element within the third window;
wherein the at least one link indicates a relationship between the initial anchor set and the first data element.

15. The system of claim 14 wherein:
the at least one link indicates a common data element that is common to the initial anchor set and the first data element.

16. The system of claim 1 wherein:
the GUI is configured to receive input from the user through the second window selecting one of the data element icons within the second window that represents a first data element, and to display content from the first data element to the user.

17. The system of claim 1 wherein:
the visual properties of each of the data element icons within the second window indicate how much the first relevance scores for the data elements in the first relevant set will change if the data elements are included in the initial anchor set.

18. A system of exploring a collection of data, the system comprising:
at least one processor and at least one memory configured to implement a controller and a Graphical User Interface (GUI) for interacting with a user to explore the collection of data, wherein the collection of data is separated into data elements;
the controller is configured, when no anchor has been selected by the user, to identify an initial set of data elements from the collection of data for presentation to the user as potential anchors for exploring the collection of data, and to identify an initial score for each data element in the initial set, wherein the initial score indicates a relevance of each data element in the initial set to the collection of data;
the GUI is configured, when no anchor has been selected by the user, to display a first window to the user, and to display data element icons within the first window representing the initial set of data elements, wherein visual properties of the data element icons within the first window indicate the magnitude of the initial score of the data elements in the initial set to the collection of data;
the GUI is configured to receive input from the user dragging at least one of the data element icons and dropping to an object displayed within the first window, wherein dragging-and dropping of the at least one of the data element icons within the first window assigns at least one of the data elements in the initial set as an initial anchor set for exploring the collection of data;
the controller is configured to identify a first relevant set of data elements that are relevant to the initial anchor set, and to identify a first relevance score for each data element in the first relevant set, wherein the first relevance score indicates relevance of each data element in the first relevant set to the initial anchor set;
the GUI is configured to display a second window to the user, to display an anchor icon for the initial anchor set within the second window, and to display the data element icons within the second window representing the first relevant set of data elements, wherein the visual properties of the data element icons within the second window indicate the magnitude of the first relevance scores of the data elements in the first relevant set to the initial anchor set.

19. The system of claim 18 wherein:
the GUI is configured to receive input from the user selecting at least one of the data element icons within the second window to modify the initial anchor set, wherein selection of the at least one of the data element icons within the second window adds at least one of the data elements in the first relevant set to the initial anchor set to create a modified anchor set; and the GUI is configured to display a third window to the user, to display the anchor icon for the modified anchor set within the third window, and to display the data element icons within the third window representing a second relevant set of data elements, wherein the visual properties of the data element icons within the third window indicate the relevance of the data elements in the second relevant set to the modified anchor set.

20. The system of claim 19 wherein:

the GUI is configured to vary a size of the data element icons within the second window to indicate the relevance of the data elements in the first relevant set to the initial anchor set.

21. The system of claim 20 wherein:

the GUI is configured to vary a position of the data element icons in relation to the anchor icon within the third window to indicate the relevance of the data elements in the second relevant set to the modified anchor set; and the GUI is configured to maintain the size of the data element icons within the third window to indicate the relevance of the data elements in the second relevant set to the initial anchor set.

22. The system of claim 18 wherein:

the GUI is configured to receive input from the user through the first window indicating at least one keyword; and the GUI is configured to re-display the first window to the user, and to display the data element icons within the first window representing the data elements of the initial set that are filtered based on the keyword.

23. The system of claim 18 wherein:

the GUI is configured to display the anchor icon toward the center of the second window, and to display the data element icons at radial positions around the anchor icon.

24. The system of claim 18 wherein:

the GUI is configured to display the anchor icon and the data element icons as circular bubbles; and the circular bubbles contain a description of their associated data element.

25. The system of claim 18 wherein:

the data elements in the first relevant set are sorted into categories;

the GUI is configured to display the data element icons related to a first category in the second window; and the GUI is configured to display the data element icons related to a second category in a third window.

26. The system of claim 25 wherein:

the GUI is configured to display the data element icons per category in a different color.

27. A method of exploring a collection of data, the method comprising: when no anchor has been selected by a user:

identifying an initial set of data elements from the collection of data for presentation to the user as potential anchors for exploring the collection of data, and identifying an initial score for each data element in the initial set, wherein the initial score indicates a relevance of each data element in the initial set to the collection of data;

displaying a first window to the user via a Graphical User Interface (GUI) for interacting with the user to explore the collection of data; and displaying data element icons within the first window via the GUI representing the initial set of data elements, wherein visual properties of the data element icons within the first window indicate the magnitude of the initial score of the data elements in the initial set to the collection of data;

receiving input from the user via the GUI dragging at least one of the data element icons and dropping to an object displayed within the first window, wherein dragging-and-dropping of the at least one of the data element icons within the first window assigns at least one of the data elements in the initial set as an initial anchor set for exploring the collection of data;

identifying a first relevant set of data elements that are relevant to the initial anchor set, and identifying a first relevance score for each data element in the first relevant set, wherein the first relevance score indicates relevance of each data element in the first relevant set to the initial anchor set;

displaying a second window to the user via the GUI;

displaying an anchor icon for the initial anchor set within the second window via the GUI; and displaying the data element icons within the second window via the GUI representing the first relevant set of data elements, wherein the visual properties of the data element icons within the second window indicate the magnitude of the first relevance scores of the data elements in the first relevant set to the initial anchor set.

28. The method of claim 27 further comprising:

receiving input from the user via the GUI selecting at least one of the data element icons within the second window to modify the initial anchor set, wherein selection of the at least one of the data element icons within the second window adds at least one of the data elements in the first relevant set to the initial anchor set to create a modified anchor set;

displaying a third window to the user via the GUI;

displaying the anchor icon for the modified anchor set within the third window via the GUI; and displaying the data element icons within the third window via the GUI representing a second relevant set of data elements, wherein the visual properties of the data element icons within the third window indicate the relevance of the data elements in the second relevant set to the modified anchor set.

29. The method of claim 28 wherein displaying the data element icons within the second window comprises:

varying a size of the data element icons within the second window to indicate the relevance of the data elements in the first relevant set to the initial anchor set.

30. The method of claim 29 wherein displaying the data element icons within the third window comprises:

varying a position of the data element icons in relation to the anchor icon within the third window to indicate the relevance of the data elements in the second relevant set to the modified anchor set; and maintaining the size of the data element icons within the third window to indicate the relevance of the data elements in the second relevant set to the initial anchor set.

31. The method of claim 27 further comprising:

receiving input from the user through the first window via the GUI indicating at least one keyword;

re-displaying the first window to the user via the GUI; and displaying the data element icons within the first window via the GUI representing the data elements of initial set that are filtered based on the keyword.

32. The method of claim 27 wherein displaying the second window to the user comprises:

displaying the anchor icon toward the center of the second window; and displaying the data element icons at radial positions around the anchor icon.

33. The method of claim 27 wherein displaying a second window to the user comprises:

displaying the anchor icon and the data element icons as circular bubbles, wherein the circular bubbles contain a description of their associated data element.

34. The method of claim 27 wherein:

the data elements in the first relevant set are sorted into categories;

the data element icons related to a first category are displayed in the second window; and the data element icons related to a second category are displayed in a third window.

35. The method of claim 34 wherein:

the data element icons per category are displayed in a different color.

* * * * *